(12) United States Patent
Liu et al.

(10) Patent No.: US 11,199,190 B2
(45) Date of Patent: Dec. 14, 2021

(54) OIL SEPARATION STRUCTURE AND COMPRESSOR

(71) Applicants: GREE ELECTRIC APPLIANCES (WUHAN) CO., LTD, Wuhan (CN); GREE ELECTRIC APPLIANCES, INC. OF ZHUHAI, Zhuhai (CN)

(72) Inventors: Hua Liu, Zhuhai (CN); Cong Cao, Zhuhai (CN); Tianyi Zhang, Zhuhai (CN); Yushi Bi, Zhuhai (CN); Helong Zhang, Zhuhai (CN); Ziyuan Huang, Zhuhai (CN); Qiangjun Meng, Zhuhai (CN)

(73) Assignees: GREE ELECTRIC APPLIANCES (WUHAN) CO., LTD, Wuhan (CN); GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 125 days.

(21) Appl. No.: 16/631,834

(22) PCT Filed: Dec. 28, 2017

(86) PCT No.: PCT/CN2017/119321
§ 371 (c)(1),
(2) Date: Jan. 17, 2020

(87) PCT Pub. No.: WO2019/052087
PCT Pub. Date: Mar. 21, 2019

(65) Prior Publication Data
US 2020/0158113 A1 May 21, 2020

(30) Foreign Application Priority Data
Sep. 13, 2017 (CN) .......................... 201710821130.5

(51) Int. Cl.
*F04C 23/00* (2006.01)
*F04C 29/02* (2006.01)
(Continued)

(52) U.S. Cl.
CPC .......... *F04C 29/026* (2013.01); *F04C 23/008* (2013.01); *F04C 29/0092* (2013.01);
(Continued)

(58) Field of Classification Search
CPC .. F04C 29/026; F04C 29/0092; F04C 29/028; F04C 29/12; F04C 23/008; F04C 23/001;
(Continued)

(56) References Cited

U.S. PATENT DOCUMENTS

| 2,446,882 A | 8/1948 | Joseph |
| 5,113,671 A | 5/1992 | Westermeyer |

(Continued)

FOREIGN PATENT DOCUMENTS

| CN | 201351587 Y | 11/2009 |
| CN | 102338059 A | 2/2012 |

(Continued)

*Primary Examiner* — Audrey B. Walter
*Assistant Examiner* — Dapinder Singh
(74) *Attorney, Agent, or Firm* — Kilpatrick Townsend & Stockton, LLP

(57) ABSTRACT

Disclosed are an oil separation structure and a compressor. The oil separation structure includes a housing and a filtering screen. A core is disposed at a center of the housing, and a plurality of guiding members for guiding gas flow are provided along circumferential directions of the core. The filtering screen is disposed on a periphery of the housing, and a cavity is formed between the filtering screen and the core. The housing is provided with a gas inlet and a gas outlet which are in communication with the cavity, and the gas inlet is configured to introduce the gas flow into the cavity; the guiding members are configured to guide the gas (Continued)

flow to rotationally flow around the core, and the gas outlet is configured to discharge the gas flow from the cavity.

14 Claims, 7 Drawing Sheets

(51) Int. Cl.
*F04C 29/00* (2006.01)
*F04C 29/12* (2006.01)

(52) U.S. Cl.
CPC ............ *F04C 29/028* (2013.01); *F04C 29/12* (2013.01); *F04C 2240/30* (2013.01); *F04C 2240/50* (2013.01); *F04C 2240/806* (2013.01)

(58) Field of Classification Search
CPC ............ F04C 2240/30; F04C 2240/50; F04C 2240/806; F04C 18/16; B01D 19/0057
See application file for complete search history.

(56) References Cited

U.S. PATENT DOCUMENTS

| | | | | |
|---|---|---|---|---|
| 5,404,730 A * | 4/1995 | Westermeyer | ....... | B01D 50/002 62/470 |
| 6,131,405 A * | 10/2000 | Griffin | ...... | F25B 43/02 62/470 |
| 6,214,071 B1 * | 4/2001 | Wang | ...... | B01D 45/16 55/337 |
| 7,771,501 B2 * | 8/2010 | Wang | ...... | B01D 50/002 55/467 |
| 7,810,351 B2 * | 10/2010 | Westermeyer | ...... | F25B 43/02 62/470 |
| 9,415,335 B2 * | 8/2016 | Huff | ...... | F25B 43/00 |
| 2006/0008359 A1 * | 1/2006 | Ito | ...... | F04B 49/22 417/222.2 |
| 2017/0045053 A1 | 2/2017 | Ge | | |

FOREIGN PATENT DOCUMENTS

| | | |
|---|---|---|
| CN | 102967095 A | 3/2013 |
| CN | 203068891 U | 7/2013 |
| CN | 203614283 U | 5/2014 |
| CN | 107355384 A | 11/2017 |
| CN | 207145244 U | 3/2018 |
| JP | H09170581 A | 6/1997 |

* cited by examiner

OIL SEPARATION STRUCTURE AND COMPRESSOR

CROSS-REFERENCES TO RELATED APPLICATIONS

This application is a U.S. National Stage of International Application No. PCT/CN2017/119321, filed on Dec. 28, 2017, which claims priority of a Chinese invention patent application No. 201710821130.5, titled "Oil Separation Structure and Compressor", filed on Sep. 13, 2017, the contents of which are hereby incorporated by reference in their entireties.

TECHNICAL FIELD

The present disclosure relates to an oil separation structure and a compressor.

BACKGROUND

In order to ensure oil separation efficiency, a conventional screw compressor is provided with a filtering device in an oil separation barrel, and the filtering device usually includes a perforated plate and an oil separation filtering screen. The gas flow is discharged from the discharge pipe, flows through the oil separation barrel and flows back to hit the perforated plate, and then is filtered by the oil separation filtering screen, thereby achieving the effect of separating oil and gas. When such a structure is adopted, more space needs to be reserved in the oil separation barrel, and the gas flow impacts only once, accordingly, the oil separation efficiency is not high.

Furthermore, as for a one-unit double-stage screw compressor, the first-stage gas discharge is in communication with the second-stage gas suction, and the internal structural space of the compressor is limited, therefore, it is necessary to develop a built-in oil separation structure that can be universally used in various types of compressors.

SUMMARY

The present disclosure provides an oil separation structure and a compressor with high oil separation efficiency.

The present disclosure provides an oil separation structure, including a housing and a filtering screen; a core is provided in a center of the housing, and multiple guiding members are provided along a circumferential direction of the core to guide a gas flow; the filtering screen is provided on an outer periphery of the housing, and a cavity is formed between the filtering screen and the core; the housing is provided with a gas inlet and a gas outlet that are in communication with the cavity; the gas inlet is configured to introduce the gas flow into the cavity; the guiding members are configured to guide the gas flow in the cavity to rotationally flow around the core; and the gas outlet is configured to discharge the gas flow out of the cavity.

In one embodiment, each of the guiding members is in a shape of an involute curve.

In one embodiment, the gas inlet is connected to a gas discharge pipe.

In one embodiment, in a direction of the gas flow in the cavity, the gas outlet is located at a downstream position of the gas inlet; the gas inlet is adjacent to the gas outlet; and the gas inlet and the gas outlet are staggered.

In one embodiment, in a circumferential direction of the gas flow in the cavity, an angle between a first line and a second line is greater than 270 degrees and less than 360 degrees; the first line is a straight line connecting a center of the gas outlet and a center of the housing; and the second line is a straight line connecting a center of gas inlet and the center of the housing.

In one embodiment, the gas inlet and the gas outlet are disposed on two opposite sides of the housing.

In one embodiment, the gas inlet and the gas outlet are disposed in a same side of the housing.

In one embodiment, the housing is provided with two gas inlets, and each of the two gas inlets is connected with a gas discharge pipe.

In one embodiment, an outer diameter of the filtering screen is greater than an outer diameter of the housing.

In one embodiment, the core is provided with a through opening.

The present disclosure provides a compressor, including any one of the oil separation structures above.

In one embodiment, the compressor includes a multi-stage compressor, a single discharge pipe compressor or a dual discharge pipe compressor.

In one embodiment, the oil separation structure is arranged between a low-pressure stage component and a high-pressure stage component of the multi-stage compressor.

In one embodiment, the oil separation structure is provided in an oil separation barrel of the single discharge pipe compressor.

In one embodiment, the oil separation structure is provided in a discharge bearing seat of the dual discharge pipe compressor.

Based on the technical solutions above, the present disclosure at least has the beneficial effects as follows:

In some embodiments, the oil separation structure includes the housing and the filtering screen; the gas flow flows through the gas inlet of the housing and enters the cavity formed between the filtering screen and the core disposed at the center of the housing; guided by the guiding members arranged in the circumferential direction of the core, the gas flow can rotationally flow in the cavity around the core. The gas flow rotationally flows in multiple directions and generates multiple impacts during flowing rotationally, thereby improving the oil-gas separation effect and oil separation efficiency. Moreover, the gas flow in the cavity is filtered by the filtering screen, so that the oil and gas is further separated, thereby improving the oil separation efficiency and the oil separation effect and reducing oil content in the gas flow. Finally, the gas flow in the cavity is discharged out of the cavity through the gas outlet disposed in the housing.

Exemplary embodiments of the present disclosure will be described hereafter with reference to the accompanying drawings, and other features and advantages of the present disclosure will become clear.

BRIEF DESCRIPTION OF THE DRAWINGS

The accompanying drawings attached to the description form a part of the disclosure and are intended to provide a further understanding of the present disclosure. The illustrative embodiments of the present disclosure and the description thereof are used for explanations of the present disclosure, but are not intended to inappropriately limit the present disclosure. In the accompanying drawings.

REFERENCE SIGNS IN THE FIGURES

Figure 1:
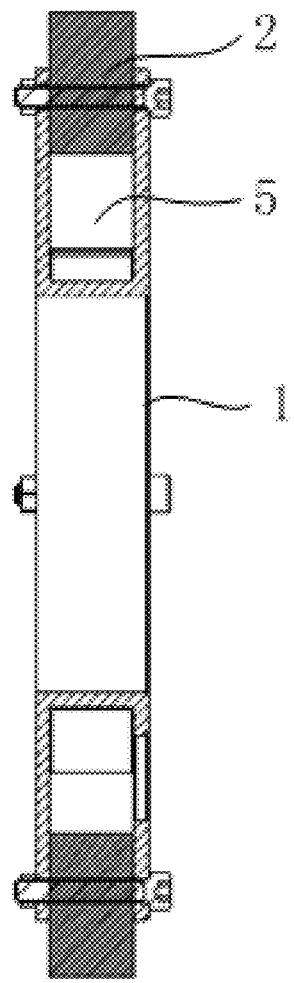
FIG. 1 is a schematic diagram of an oil separation structure according to one or more embodiments of the present disclosure.

1—housing; 2—filtering screen; 3—core; 4—guiding members; 5—cavity; 6—gas inlet; 7—gas outlet;
10—oil separation structure; 20—medium-pressure stage compressor body; 30—discharge bearing seat; 40—oil separation barrel; 50—oil cylinder; 60—gas outlet of compressor.

DETAILED DESCRIPTION OF THE INVENTION

The technical solutions in the embodiments of the present disclosure will be clearly and completely described hereafter with reference to the accompanying drawings in the embodiments of the present disclosure. Apparently, the embodiments in the description are merely some embodiments, but not all embodiments of the present disclosure. The following description of at least one exemplary embodiment is merely illustrative, but not intended to limit the present disclosure and the application or the use thereof. Based on the embodiments of the present disclosure, other embodiments obtained by a person of ordinary skill in the art without creative efforts all fall within the protection scope of the present disclosure.

Unless otherwise specified, the relative arrangements of the components and steps, numeric expressions and values described in these embodiments are not intended to limit the scope of the disclosure. Moreover, it should be understood that, for convenience of description, the dimensions of the parts shown in the accompanying drawings are not drawn to scale according to the actual proportion. The technologies, methods and equipment known to those of ordinary skill in the art may not be discussed in detail, but, where appropriate, the technologies, the methods and the equipment shall be considered as part of the granted specification. In all the examples shown and discussed herein, any specific value should be interpreted as merely an example, but not as a limitation. Other examples of illustrative embodiments may therefore have different values. It should be noted that similar reference numerals and letters in the following figures denote similar terms, therefore once a particular term is defined in one of the figures, no further discussion is required in the subsequent figures.

In the description of the present disclosure, it should be understood that orientations or position relationships, indicated by the terms such as "center", "longitudinal", "transverse", "front", "back", "left", "right", "vertical", "horizontal", "top", "bottom", "inside", "outside" and so on, are based on the orientations or position relationships shown in the drawings, and are merely used for conveniently describing the present disclosure and simplifying the description, rather than indicating or implying that the apparatus or element referred to definitely has a particular orientation, is constructed and operated in a particular orientation, and thus are not to be understood to limit the protection scope of the present disclosure.

Figure 2:
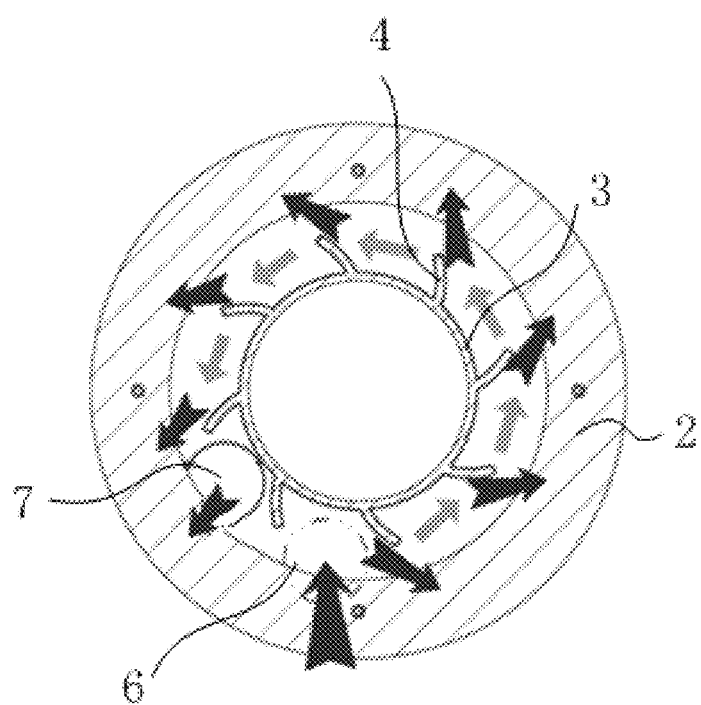
FIG. 2 is a schematic diagram illustrating flowing directions of a gas flow in an oil separation structure according to one or more embodiments of the present disclosure.

As shown in FIG. 1 and FIG. 2, oil separation structures are provided in some embodiments. The oil separation structure includes a housing 1 and a filtering screen 2. The housing 1 is a hollow structure. A core 3 is provided in the center of the housing 1, and multiple guiding members 4 are provided along a circumferential direction of the core 3 and configured to guide the gas flow. The filtering screen 2 is provided on an outer periphery of the housing 1. A cavity 5 is formed between the filtering screen 2 and the core 3. The housing 1 is provided with a gas inlet 6 and a gas outlet 7 that are in communication with the cavity 5. The gas inlet 6 is configured to introduce the gas flow into the cavity 5; the guiding members 4 are configured to guide the gas flow in the cavity 5 to flow rotationally around the core 3; and the gas outlet 7 is configured to discharge the gas flow out of the cavity 5.

In some embodiments, the gas flow flows through the gas inlet 6 and enters the cavity 5. Guided by the guiding members 4, the gas flow can flow rotationally in the cavity 5 around the core 3. The gas flow rotationally flows in multiple directions and generates multiple impacts during flowing rotationally, thereby improving the oil-gas separation effect and oil separation efficiency. Moreover, the gas flow in the cavity 5 is filtered by the filtering screen 2, so that the oil and gas is further separated, thereby improving the oil separation efficiency and the oil separation effect and reducing oil content in the gas flow. Finally, the gas flow in the cavity 5 is discharged out of the cavity 5 through the gas outlet 7.

In some embodiments, the gas inlet 6 and the gas outlet 7 are arranged to avoid areas corresponding to the guiding members 4. For example, the gas inlet 6 and the gas outlet 7 are both disposed at a position between two neighboring guiding members 4.

In some embodiments, the guiding member 4 is in a shape of an involute curve. The built-in guiding members 4 in the shapes of involute curves can better guide the gas flow in the cavity 5 to flow rotationally around the core 3, to generate multiple impacts, thereby improving the oil separation effect.

In some embodiments, the guiding member 4 can be a rib in a shape of involute curve.

In some embodiments, the gas inlet 6 can be connected to a discharge pipe. For example, the gas inlet is connected to the discharge pipe of the compressor, so as to perform oil separation for the gas flow in the compressor.

In some embodiments, as shown in FIG. 2, the gas inlet 6 and the gas outlet 7 can be disposed on opposite sides of the housing 1. The oil separation structure is applicable to a multi-stage compressor, and the oil separation structure is provided between a low-pressure stage component and a high-pressure stage component of the multi-stage compressor. The gas flow in the compressor flows from the low-pressure stage component to the high-pressure stage component, therefore the gas inlet 6 and the gas outlet 7 are arranged on different sides of the housing 1. The gas inlet 6 is connected to the gas discharge end of the low-pressure stage component, and the gas outlet 7 is connected to the gas inlet end of the high-pressure stage component.

In some embodiments, when the oil separation structure is provided between the high-pressure stage component and the low-pressure stage component of the multi-stage compressor, in order to avoid a coupling and not to hinder the shaft connection between the high-pressure stage component and the low-pressure stage component, the core 3 is provided with a through opening that allows the coupling or the shaft to pass there through.

The above-mentioned multi-stage compressor can include a double-stage compressor or a three-stage compressor or a compressor with more stages. The double-stage compressor includes a one-unit double-stage screw compressor.

As shown in FIG. 2, in the direction of the gas flow in the cavity 5, the gas outlet 7 is located at a downstream position of the gas inlet 6. The gas inlet 6 is adjacent to the gas outlet 7, and the gas inlet 6 and the gas outlet 7 are staggered relative to an axial direction and/or a circumferential direction of the compressor, so that the gas flow can flow rotationally in the cavity 5 as much as possible. For example, as shown in FIG. 2, the gas flow rotates around core 3 for nearly one revolution.

In one embodiment, in the circumferential direction of the gas flow in the cavity 5, the angle between a first line and a second line is greater than 270 degrees and less than 360 degrees, where the first line is a straight line connecting a center of the gas outlet 7 and a center of the housing 1, and the second line is a straight line connecting a center of gas inlet 6 and the center of the housing 1.

Figure 5:
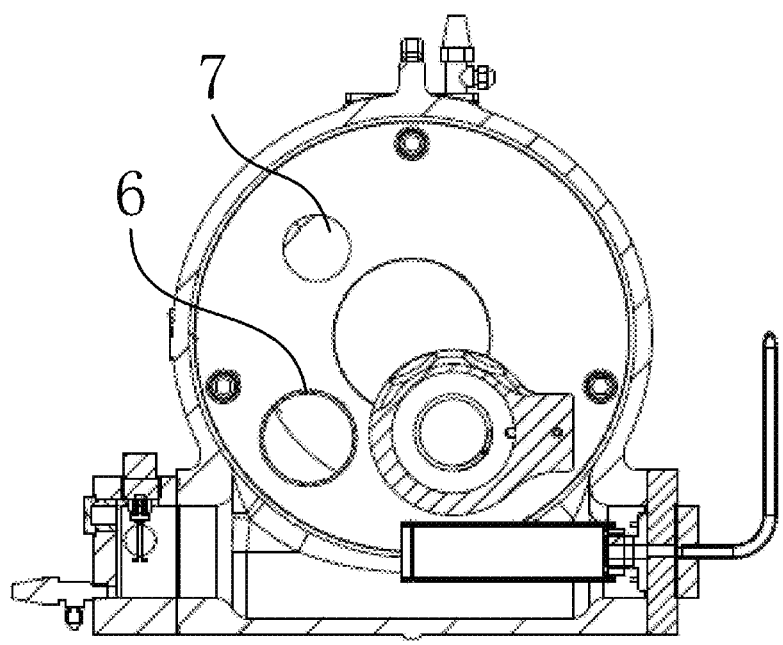
FIG. 5 is a schematic diagram illustrating a distribution of the gas inlet and the gas outlet of the oil separation structure applied in the single discharge pipe compressor according to one or more embodiments of the present disclosure.

As shown in FIG. 5, the gas inlet 6 and the gas outlet 7 can also be disposed in the same side of the housing 1. The oil separation structure can be arranged in the oil separation barrel disposed at the discharge end of the terminal stage of the compressor. Since the discharge end and the gas outlet of the compressor are both disposed at upstream positions of the oil separation structure, the gas inlet 6 and the gas outlet 7 are disposed in the same side of the housing 1. The gas flow from the discharge end of the compressor flows through gas inlet 6 and enters into the cavity 5, and flows rotationally in cavity 5 and impacts for multiple times to make the oil and gas separated, and then is filtered by the filtering screen 2 and discharged out of the gas outlet 7, finally is discharged out of the compressor through the gas outlet of the compressor. That is, the gas flow enters the cavity 5 from one side of housing 1, and eventually is also discharged from the same side of the housing 1.

As shown in FIG. 5, in the direction of the gas flow in the cavity 5, the gas outlet 7 is located at a downstream position of the gas inlet 6. The gas inlet 6 is adjacent to the gas outlet 7, and the gas inlet 6 and the gas outlet 7 are staggered relative to the circumferential direction of the compressor, so that the gas flow can flow rotationally in the cavity 5 as much as possible.

In one embodiment, in the circumferential direction of the gas flow in the cavity 5, the angle between a first line and a second line is greater than 270 degrees and less than 360 degrees, where the first line is a straight line connecting a center of the gas outlet 7 and a center of the housing 1, and the second line is a straight line connecting a center of gas inlet 6 and the center of the housing 1.

Figure 7:
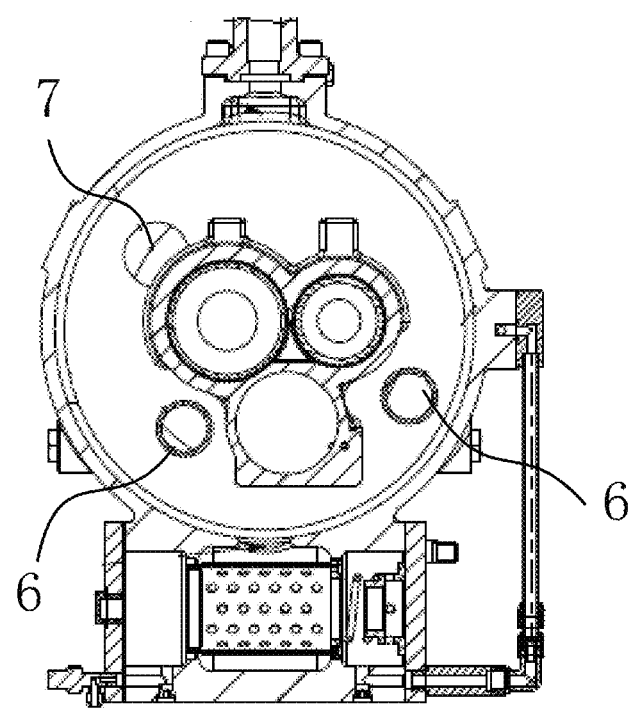
FIG. 7 is a schematic diagram illustrating a distribution of the gas inlet and the gas outlet of the oil separation structure applied in the dual discharge pipe compressor according to one or more embodiments of the present disclosure.

As shown in FIG. 7, the housing 1 can also be provided with two gas inlets 6, and each of the two gas inlets 6 is connected with a gas discharge pipe. For example, two gas inlets 6 are respectively connected with two discharge pipes of a dual discharge pipe compressor, so as to separate the oil and gas for the gas flow in the compressor.

In some embodiments, the outer diameter of the filtering screen 2 can be greater than the outer diameter of the housing 1.

When the oil separation structure of the embodiment of the present disclosure is provided at the discharge end of the terminal stage of the compressor, the core 3 can also be a closed cylindrical structure.

As described in all embodiments above, the oil separation structure provided by the embodiments of the present disclosure can be applied to various types of compressors, and can be arranged at different portions of the compressor.

The present disclosure also provides an embodiment of a compressor. In the embodiment, the compressor includes the oil separation structure in any one of the above embodiments.

In some embodiments, the compressors can include a multi-stage compressor, a single discharge pipe compressor, a dual discharge pipe compressor, and the like.

In the present disclosure, the fixing patterns of the oil separation structure are adjusted to enable the oil separation structure to applicable for various types of compressors.

Figure 3:
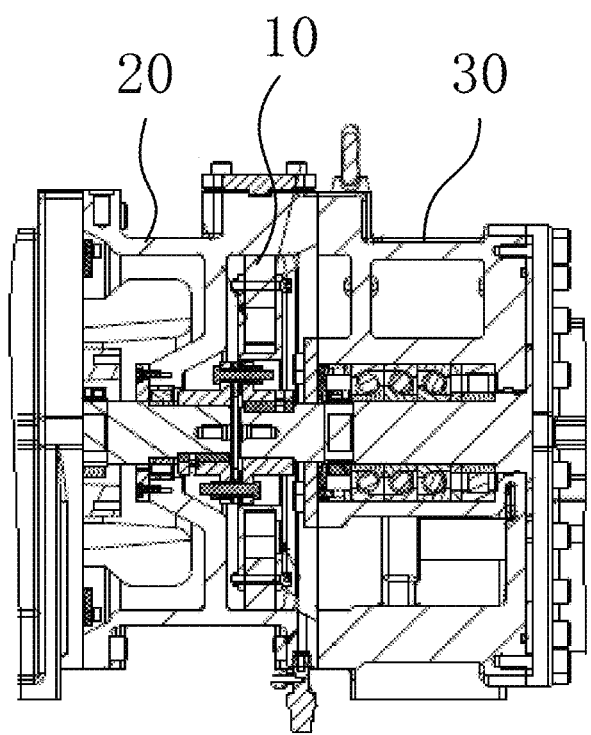
FIG. 3 is a partial schematic diagram illustrating the oil separation structure applied in a multi-stage compressor according to one or more embodiments of the present disclosure.

As shown in FIG. 3, in some embodiments, the oil separation structure 10 can be arranged between the low-pressure stage component and the high-pressure stage component of the multi-stage compressor, and specifically, is provided inside a medium-pressure stage compressor body 20 between the low-pressure stage component and the high-pressure stage component.

After the discharged gas of the low-pressure stage component flows through the oil separation structure 10, the gas flow enters the high-pressure stage component to be compressed. The frozen oil filtered by the oil separation structure 10 is discharged out through an oil drain slot disposed on the medium-pressure stage compressor body 20 and flows back to the system through an oil return valve.

As shown in FIG. 1, the filtering screen 2 can be fixed on the housing 1 with bolts and fixing nuts. The outer diameter of the filtering screen 2 is slightly larger than the inner diameter of the medium-pressure stage compressor body 20. During assembling the oil separation structure 10, the oil separation structure 10 can be pressed into and fixed in the medium-pressure stage compressor body 20, so as to ensure the oil separation structure 10 not to shake.

In a specific embodiment, since the discharge outlet of the low-pressure stage component is disposed at the bottom, the gas inlet 6 of the housing 1 of the oil separation structure 10 is disposed at the bottom of the housing 1. As shown in FIG. 2, the gas flow (mixture of oil and gas) flows through the gas inlet 6 disposed at the bottom and enters the cavity 5 of housing 1. Guided by the guiding members 4, the gas flow rotationally flows in the tangential directions, and the oil and gas are separated under the action of the tangential forces. After impacting, the gas flow is separated again by the filtering screen 2. The separated gas flow is mostly discharged from the gas outlet 7 of the housing 1, and a small amount of the separated gas flow flows out from the periphery of the filtering screen 2. The frozen oil in the oil separation structure 10 flows out from the lower portion and flows back to the system through the oil return valve.

As the guiding members 4 with shapes of involute curves are provided, the gas flow rotationally flows and is separated by multiple impacts, thereby greatly improving the oil separation efficiency. As the outer diameter of housing 1 is slightly less than the outer diameter of filtering screen 2, a part of the gas flow can flow out from the filtering screen 2. Since the space formed between housing 1 and its external compressor body is closed, the gas flow can only rotationally flows along the flow channel inside the housing 1, ensuring that most of the gas flow is discharged out from the gas outlet 7 of the housing 1.

The above oil separation structure 10 is provided between the low-pressure stage component and the high-pressure stage component of the multi-stage compressor, and the gas inlet 6 and the gas outlet 7 of the housing 1 are provided in different sides of the housing 1. When the oil separation structure 10 is provided in the oil separation barrel of the discharge end of the terminal stage of the multi-stage compressor, or provided in the oil separation barrel of the single discharge pipe compressor, or provided in the oil separation barrel of the dual discharge pipe compressor, the gas inlet 6 and the gas outlet 7 are disposed in the same side of housing 1. Therefore, the oil separation structure 10 provided by the embodiment of the present disclosure can also be applied to a compressor of any other structure, only through adjusting the gas inlet 6 and the gas outlet 7 of the housing 1 of the oil separation structure 10.

Figure 4:
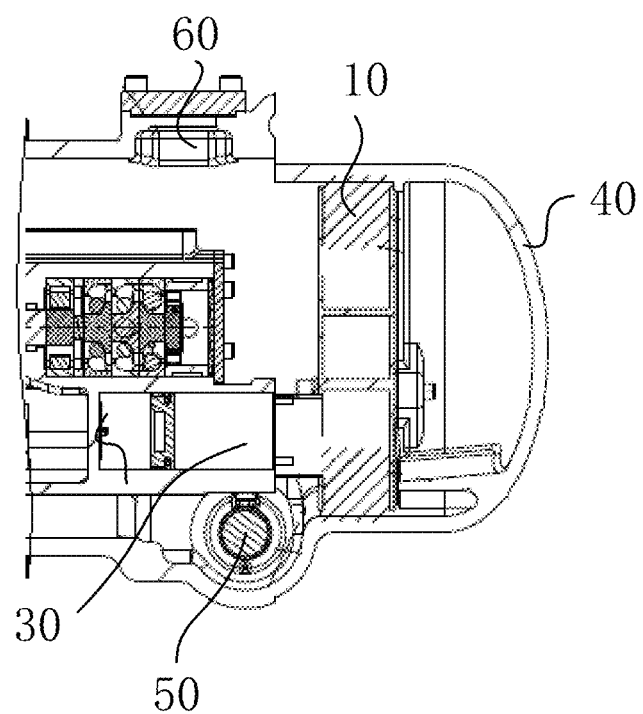
FIG. 4 is a partial schematic diagram illustrating the oil separation structure applied in a single discharge pipe compressor according to one or more embodiments of the present disclosure.

As shown in FIG. 4, the oil separation structure 10 can be provided in the oil separation barrel 40 of a single discharge pipe compressor. It is relatively stable to fix the oil separation structure 10 on the oil separation barrel 40.

In some embodiments, the filtering screen 2 and the housing 1 of the oil separation structure 10 can be fixed on the oil separation barrel 40 with screws, without providing a fixing structure for the oil separation structure 10.

The gas flow (mixture of oil and gas) flows through the discharge pipe and flows out of the discharge bearing seat 30. Since the discharge end of the discharge bearing seat 30 of the compressor and the gas outlet 60 of the compressor are disposed at the same side of the oil separation structure 10, the gas inlet 6 and the gas outlet 7 of the housing 1 of the oil separation structure 10 are disposed in the same side of housing 1. The gas inlet 6 is disposed at a lower position of the housing 1 and connected with the discharge pipe of the discharge end of the discharge bearing seat 30. The gas outlet 7 is disposed at an upper position of the housing 1 and connected with the gas outlet 60 of the compressor to avoid the guiding members 4. The frozen oil separated by the oil separation structure 10 flows into the oil cylinder 50 through the oil drain slot, and then flows through the oil filter and is pressed back into the compressor, to begin a next cycle.

Figure 6:
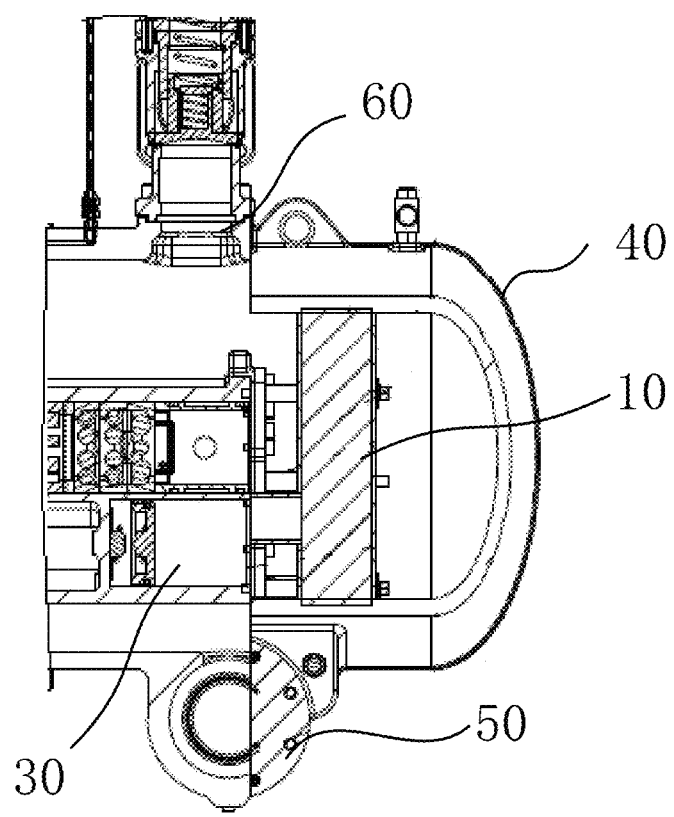
FIG. 6 is a partial schematic diagram illustrating the oil separation structure applied in a dual discharge pipe compressor according to one or more embodiments of the present disclosure.

As shown in FIG. 6, the oil separation structure 10 can be provided in the discharge bearing seat 30 of a dual discharge pipe compressor. Limited by the structure of the dual discharge pipe compressor, it is not beneficial to fix the oil separation structure 10 in the oil separation barrel 40. Therefore, the filtering screen 2 and the housing 1 of the oil separation structure 10 can be fixed to the discharge bearing seat 30 by a fixing rod, without providing a fixing structure on the oil separation structure 10 and in the oil separation barrel 40.

The gas flow (mixture of oil and gas) flows out of the discharge bearing seat 30 through two discharge pipes. Since the discharge end of the compressor discharge bearing seat 30 and the gas outlet 60 of the compressor are disposed at the same side of the oil separation structure 10, the gas inlet 6 and the gas outlet 7 of the housing 1 of the oil separation structure 10 are disposed in the same side of the housing 1. The gas inlet 6 is disposed at the lower position of the housing 1 and connected with the two discharge pipes of the discharge end of the discharge bearing seat 30. The gas outlet 7 is disposed at the upper position of the housing 1 and connected with the compressor gas outlet 60 to avoid the guiding members 4. The frozen oil separated by the oil separation structure 10 flows into the oil cylinder 50 through the oil drain slot, and then flows through the oil filter and is pressed back into the compressor, to begin the next cycle.

As described in the above embodiments, the oil separation structure 10 provided by the embodiments of the present disclosure can be applied to different types of compressors and be provided at different positions of the compressor only by means of simply adjusting the gas inlet and the gas outlet and adjusting the manner of fixing the oil separation structure inside the compressor, therefore the oil separation structure 10 can be used as a built-in oil separation structure for various types of compressor.

During the application of the oil separation structure 10 provided by the embodiments of the present disclosure, the manner of fixing the oil separation structure 10 inside the compressor is not limited to what described above, but can be adjusted according to actual requirements. By adopting the oil separation structure 10 provided by the embodiment of the present disclosure, the oil separation efficiency can be greatly improved. Moreover, as the structure of the oil separation structure is variable, the oil separation structure can be applied to a variety of structural forms and has a good applicability.

It should be noted that the gas flow discharged from the discharge end of the compressor contains frozen oil and is a mixture of oil and gas. The mixture of oil and gas needs to be separated, so as to improve energy efficiency of compression.

Finally, it should be noted that the above-described embodiments are only examples for illustrating the technical solutions of the present disclosure, but not intended to limit the present disclosure. Although the present disclosure is described in detail with reference to the embodiments, it should be understood by those skilled in the art that several modifications of the specific embodiments of the present disclosure or equivalent replacements of partial technical features may be made without departing from the spirits of the technical solutions of the disclosure, and all modifications or equivalent replacements are within the protection scope of the present disclosure.

The invention claimed is:

1. An oil separation structure, comprising:
    a housing and a filtering screen;
    wherein, a core is provided in a center of the housing, and multiple guiding members are provided on an outer surface of the core facing the housing along a circumferential direction of the core to guide a gas flow;
    the filtering screen is provided on an outer periphery of the housing parallel to a rotation axis of the core, and a cavity is formed between the filtering screen and the core;
    the housing is provided with a gas inlet and a gas outlet that are in communication with the cavity;
    the gas inlet is configured to introduce the gas flow into the cavity; the guiding members are configured to guide the gas flow in the cavity to rotationally flow around the core; and
    the gas outlet is configured to discharge the gas flow out of the cavity.

2. The oil separation structure according to claim 1, wherein, a cross section of each of the guiding members is in a shape of an involute curve.

3. The oil separation structure according to claim 1, wherein, the gas inlet is connected to a gas discharge pipe.

4. The oil separation structure according to claim 1, wherein, in a direction of the gas flow in the cavity, the gas outlet is located at a downstream position of the gas inlet; the gas inlet is adjacent to the gas outlet; and the gas inlet and the gas outlet are staggered.

5. The oil separation structure according to claim 4, wherein, in a circumferential direction of the gas flow in the cavity, an angle between a first line and a second line is greater than 270 degrees and less than 360 degrees; the first line is a straight line connecting a center of the gas outlet and a center of the housing; and the second line is a straight line connecting a center of gas inlet and the center of the housing.

6. The oil separation structure according to claim 1, wherein, the gas inlet and the gas outlet are disposed on two opposite sides of the housing.

7. The oil separation structure according to claim 1, wherein, the gas inlet and the gas outlet are disposed in a same side of the housing.

8. The oil separation structure according to claim 1, wherein, an outer diameter of the filtering screen is greater than an outer diameter of the housing.

9. The oil separation structure according to claim 1, wherein, the core is provided with a through opening.

10. A compressor, comprising the oil separation structure of claim 1.

11. The compressor according to claim 10, comprising a multi-stage compressor, a single discharge pipe compressor or a dual discharge pipe compressor.

12. The compressor according to claim 11, wherein, the oil separation structure is arranged between a low-pressure stage component and a high-pressure stage component of the multi-stage compressor.

13. The compressor according to claim 11, wherein, the oil separation structure is provided in an oil separation barrel of the single discharge pipe compressor.

14. The compressor according to claim 11, wherein, the oil separation structure is provided in a discharge bearing seat of the dual discharge pipe compressor.

* * * * *